United States Patent
Delaney et al.

(10) Patent No.: US 11,329,954 B1
(45) Date of Patent: May 10, 2022

(54) TRACELESS ACCESS TO REMOTE DEPLOYED DEVICES IN UNDISCLOSED LOCATIONS

(71) Applicant: Berryville Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US)

(73) Assignee: Berryville Holdings, LLC, Herndon, VA (US)

( * ) Notice: Subject to any disclaimer, the term of this patent is extended or adjusted under 35 U.S.C. 154(b) by 0 days.

(21) Appl. No.: 16/943,273

(22) Filed: Jul. 30, 2020

Related U.S. Application Data

(60) Provisional application No. 62/880,178, filed on Jul. 30, 2019.

(51) Int. Cl.
*H04L 65/00* (2022.01)
*H04L 29/06* (2006.01)
*G06F 16/955* (2019.01)
*H04L 67/00* (2022.01)

(52) U.S. Cl.
CPC ........ *H04L 63/0236* (2013.01); *G06F 16/955* (2019.01); *H04L 63/168* (2013.01); *H04L 67/34* (2013.01)

(58) Field of Classification Search
CPC ... H04L 63/0236; H04L 63/168; H04L 67/34; G06F 16/955
See application file for complete search history.

(56) References Cited

U.S. PATENT DOCUMENTS

| | | | |
|---|---|---|---|
| 8,161,173 B1* | 4/2012 | Mishra | G06F 21/6236 709/229 |
| 8,296,833 B2* | 10/2012 | Cisler | G06F 21/33 726/8 |
| 9,614,729 B2* | 4/2017 | Crudele | H04L 41/0889 |
| 9,807,608 B2* | 10/2017 | Cha | H04W 12/086 |
| 10,021,124 B2* | 7/2018 | Oliphant | H04L 63/14 |
| 10,038,696 B1* | 7/2018 | Marcovecchio | H04L 63/10 |
| 10,412,118 B1* | 9/2019 | Davis | H04L 63/20 |
| 10,462,008 B2* | 10/2019 | Wei | H04L 41/0806 |
| 10,498,583 B1* | 12/2019 | Davis | H04L 63/0807 |
| 2008/0267169 A1* | 10/2008 | Mundra | H04M 7/0084 370/352 |
| 2011/0154130 A1* | 6/2011 | Helander | H04L 65/1006 714/48 |
| 2012/0304245 A1* | 11/2012 | Lawson | H04L 63/08 726/1 |

(Continued)

*Primary Examiner* — Jimmy H Tran
(74) *Attorney, Agent, or Firm* — Jones Day

(57) ABSTRACT

A bridge application receives a request from a remote device to access a support server. Subsequently, the bridge application established a secure connection between the bridge application and the support server and establishes a secure connection between the bridge application and the remote device. Once these secure connections are both established, communications are relayed between the remote device and the support server to effect a software change to network device. The secure connections are later terminated upon completion of the software change to the remote device. Related apparatus, systems, techniques and articles are also described.

21 Claims, 6 Drawing Sheets

(56) References Cited

U.S. PATENT DOCUMENTS

| | | | | |
|---|---|---|---|---|
| 2013/0019297 A1* | 1/2013 | Lawson | H04L 67/02 | 726/7 |
| 2013/0219471 A1* | 8/2013 | Brown | H04W 12/08 | 726/4 |
| 2013/0332548 A1* | 12/2013 | Bomgaars | H04L 63/20 | 709/206 |
| 2014/0044123 A1* | 2/2014 | Lawson | H04L 65/1069 | 370/352 |
| 2014/0067906 A1* | 3/2014 | Kim | H04L 41/08 | 709/202 |
| 2016/0197780 A1* | 7/2016 | Lim | H04L 12/2803 | 709/213 |
| 2017/0118217 A1* | 4/2017 | Sama | H04L 67/141 | |
| 2017/0192835 A1* | 7/2017 | Narayanan | H04L 41/06 | |
| 2018/0295134 A1* | 10/2018 | Gupta | H04L 67/28 | |
| 2018/0338007 A1* | 11/2018 | Reddy | H04L 12/66 | |
| 2019/0020637 A1* | 1/2019 | Andersen | H04L 45/745 | |
| 2019/0312927 A1* | 10/2019 | Shalunov | H04L 67/1091 | |
| 2019/0379557 A1* | 12/2019 | Mahzari | H04L 12/462 | |
| 2020/0177564 A1* | 6/2020 | Arisankala | H04L 63/0485 | |
| 2021/0126795 A1* | 4/2021 | Blackie | H04W 4/40 | |

* cited by examiner

TRACELESS ACCESS TO REMOTE DEPLOYED DEVICES IN UNDISCLOSED LOCATIONS

CROSS-REFERENCE TO RELATED APPLICATIONS

This application claims priority to U.S. Provisional Application No. 62/880,178, filed Jul. 30, 2019, which is incorporated herein by reference in its entirety.

TECHNICAL FIELD

The subject matter described herein relates to the provision of traceless access to remotely deployed devices at undisclosed locations.

BACKGROUND

When a computing device is deployed into the field, on occasion it becomes necessary for a technician to access the device in order to troubleshoot, perform maintenance, upgrade installed software, or for other purposes. When physical access to the device is impossible, impractical, or otherwise unavailable, remote access to the device via network communications is used.

Such remote access may not always be desirable based on various factors. For example, allowing inbound network access to a computing device provides an attack surface for malicious hackers to attempt to compromise the device. As another example, providing the technician with a network address belonging to the computing device can provide the technician with sensitive information about the deployment location of the device. Further, allowing the technician to communicate with the computing device directly creates forensic records on the device itself indicating the location the technician accessed it from; on the technician's local machine and/or network indicating the location the device was when it was accessed; and in both locations indicating that a direct communication between the two occurred. Lastly, during any direct connection between the technician and the device, a malicious entity with access to the network traffic between the technician and the device can discover the existence of the connection, and determine an associative relationship between the location of the device and the location of the technician. Such a scenario can provide cause for more aggressive investigation of one or both network locations and/or attempts to compromise them.

SUMMARY

In a first aspect, a bridge application receives a request from a remote device to access a support server. Subsequently, the bridge application established a secure connection between the bridge application and the support server and establishes a secure connection between the bridge application and the remote device. Once these secure connections are both established, communications are relayed between the remote device and the support server to effect a software change to network device. The secure connections are later terminated upon completion of the software change to the remote device.

The remote device can be a router providing access to a secure computing network.

The support server can be configured to accept inbound connections via secure shell (SSH). Alternatively, the support server can be configured to allow outbound connections only and reject all inbound connections.

The bridge application can be configured to accept authenticated inbound connections only from the remote device and the support server and to route network traffic between the remote device and the support server. In other variations, the bridge application can be configured to only accept authenticated inbound connections from the remote device and, when received, the bridge application initiates a connection with the support server and routes network traffic between the remote device and the support server.

The request to access the support server can be initiated in response to a user-generated action via the remote device. In other variations, the request to access the support server can be initiated according to a pre-defined schedule.

The request to access the support server can be triggered upon an occurrence of an event.

The remote device can access the bridge application using a fixed URL to effect the request. Alternatively, the remote device can access the bridge application using a cryptographically calculated URL to effect the request.

The bridge application can execute, in some implementations, on a platform-as-a-service (PaaS) container.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. In particular, the current subject matter provides many technical advantages as it pertains to the updating or modification of software on a remote computing device. For example, the current subject matter provides an arrangement such that there are no attack surfaces present on the remote device that could be exploited by malicious actors. Further, network locations of remote devices can be hidden from remote technicians accessing such devices such that there are no records on the remote device of the location from which the technician connected from and, similarly, the location of the remote device is not maintained or otherwise available to the technician and/or the corresponding support server. Still further, the communication path between the remote device and the support server is arranged so as to avoid man-in-the-middle attacks or other interceptions by third parties (which might be able to correlate the support server with the remote device for malicious activities).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
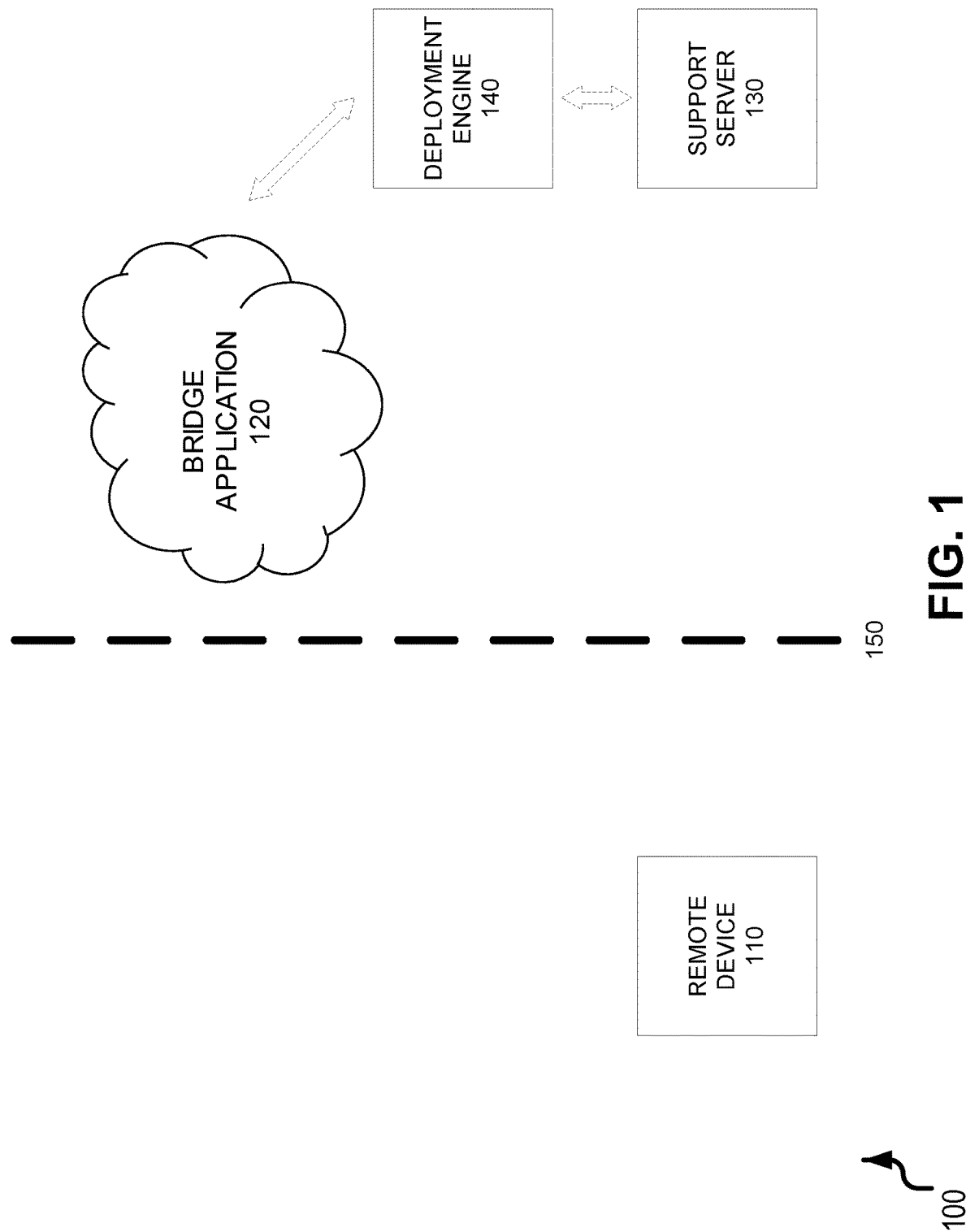
FIG. 1 is a first diagram illustrating a computing environment for implementing subject matter described herein.
Figure 2:
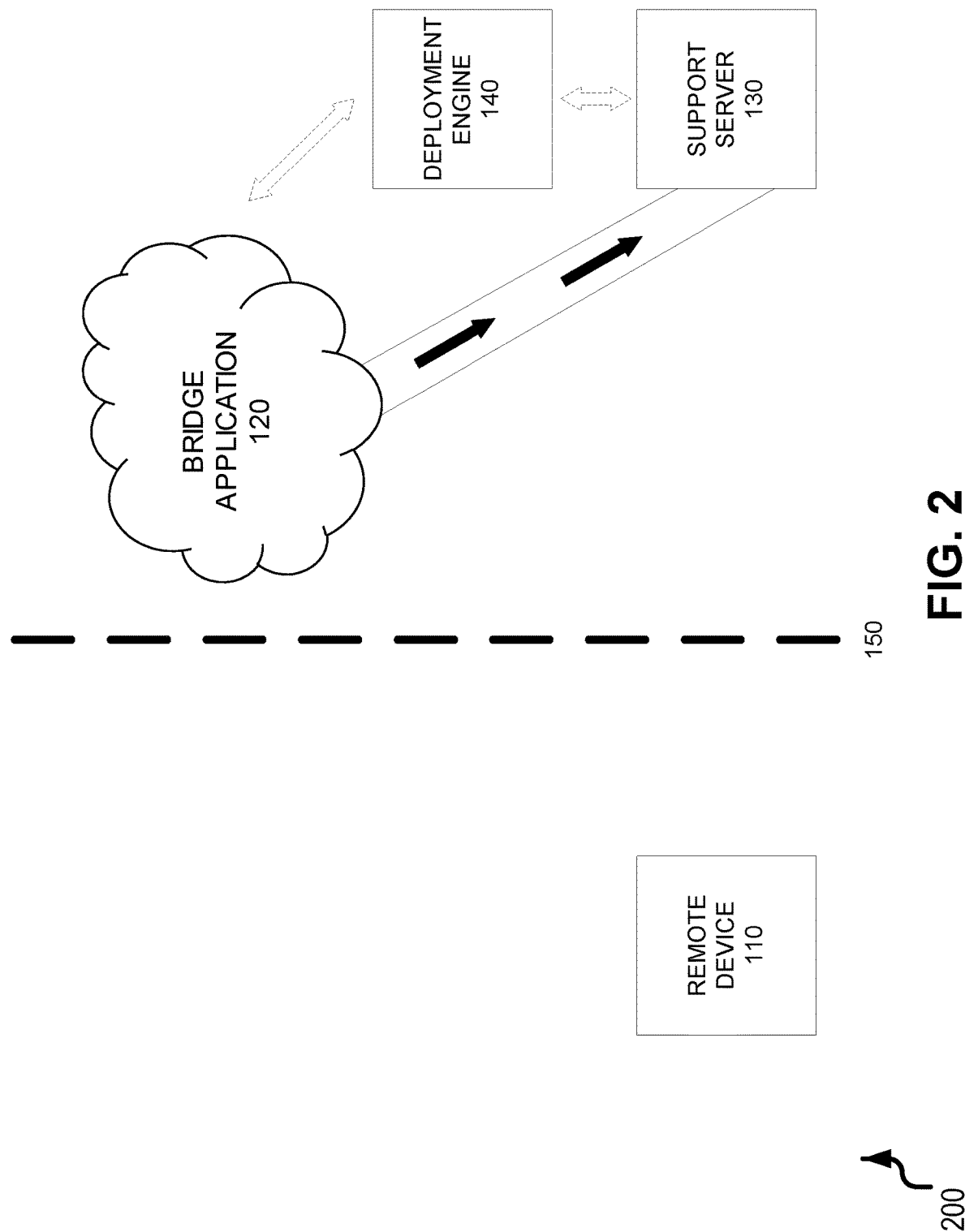
FIG. 2 is a second diagram illustrating a computing environment for implementing subject matter described herein.
Figure 3:
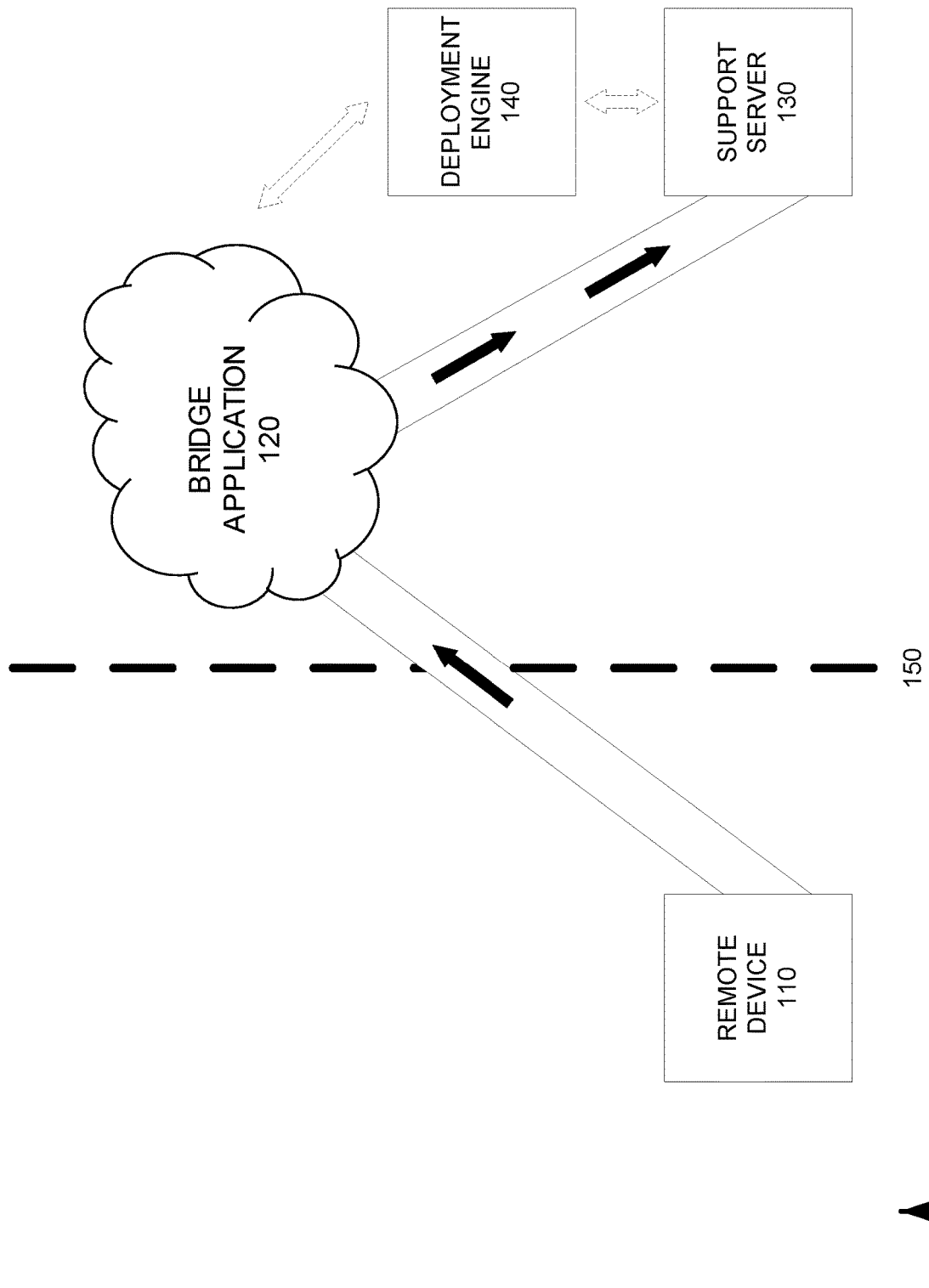
FIG. 3 is a third diagram illustrating a computing environment for implementing subject matter described herein.
Figure 4:
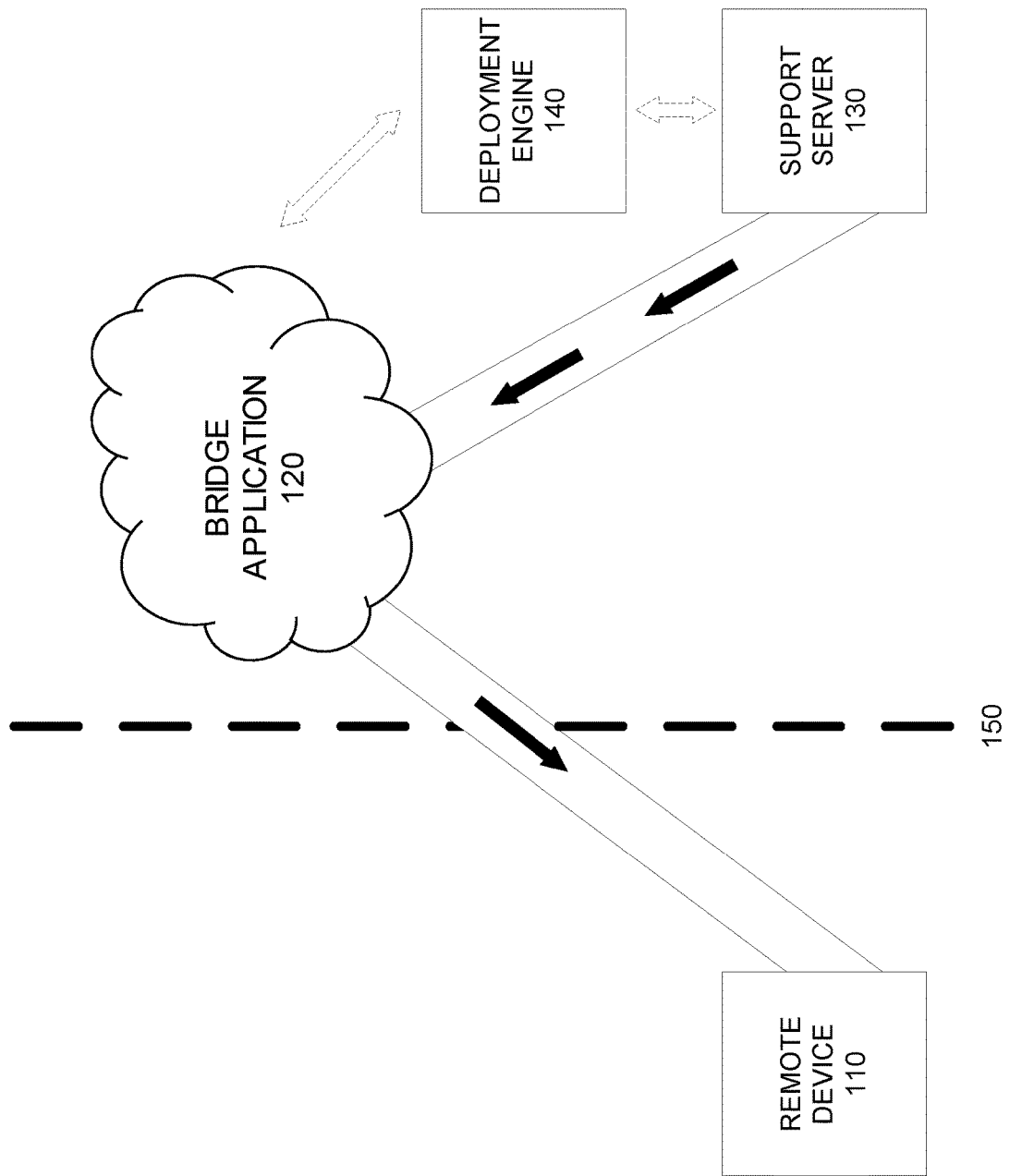
FIG. 4 is a fourth diagram illustrating a computing environment for implementing subject matter described herein.

The current subject matter is directed to techniques and related systems which allows for remote devices to communicate with remote servers in a manner that cannot be traced (sometimes referred to herein as a traceless bridge). FIGS. 1-4 are diagrams 100-400 which illustrates an example computing environment for implementing the current subject matter. The system can include three main elements: a remote computing device 110 executing application software, a bridge application 120, a support server 130, and a deployment engine 140.

The remote computing device 110 can take various forms including, for example, a router, an IoT device, or other network-enabled computing device which may, for example, require periodic updating or other service.

The bridge application 120 can be, for example, a Platform-as-a-Service or other container-virtualized application running in a cloud-, PaaS-, or container-provider on the Internet. The bridge application 120 can be configured to accept properly-authenticated inbound connections only from the remote device 110 and the support server 130 and to route network traffic between them. Alternatively, the bridge application 120 can be configured to accept only properly-authenticated inbound connections from the remote device 110, and, when it receives one, to initiate a connection between itself and the support server 130, and then route traffic between the two connections (i.e., the connection between the remote device 110 and the bridge application 120 and, on the other hand, the connection between the bridge application 120 and the support server 130).

The support server 130 can be or otherwise include, for example, a technician's workstation with Secure Shell (SSH) server and client software installed. The support server 130 can, as one example, be configured to accept inbound connections via SSH or to allow outbound connections only, and reject all inbound connections.

The deployment engine 140 can manage the deployment of the bridge application 120. The deployment engine 140 can be executed on a standalone server or, in some cases, it can be executed by the support server 130. The deployment engine 140 can be configured, with per-traceless-bridge granularity, whether to deploy instances of the bridge application 120 that are persistent, or ones that are periodic and ephemeral and, if they are ephemeral, whether to use a fixed URL, or to use a cryptographically calculated URL.

At an appropriate time (whether per a schedule, or on a persistent basis) the deployment engine 140 can deploy a running instance of the bridge application 120 for a particular traceless bridge (i.e., a connection between the computing device 110 and the support server 130).

As noted above, the bridge application 120 can execute on a PaaS, container, or other virtualized compute instance in the cloud, waiting for connections from the remote device 110, the support server 130, or both. In some variations, the bridge application 120 can be accessed only through a unique Uniform Resource Locator (URL).

The bridge application 120 can be deployed in various ways. In a first technique, the bridge application 120 can be deployed on a persistent instance with a fixed and known URL, which is created at the time the system is set up, so that the remote device 110 and the support server 130 can be preconfigured to know the location of the bridge application 120 and may connect to it at any time. In another arrangement, the bridge application 120 can be deployed on an intermittently-deployed instance with a fixed and known URL, which is determined at the time the system is set up, so that the remote device 110 and the support server 130 can be preconfigured to know the location of the bridge application 120 but can only connect to it during either pre-defined time intervals or during time intervals when the bridge application 120 is actually deployed and active. In yet another variation, the bridge application 120 can be deployed on an intermittently-deployed instance with a URL that is calculated using a cryptographic algorithm (e.g. a salted time-based hash) based on a pre-shared value such that the remote device 110 and the support server 130 can determine the URL at which the bridge application 120 will be deployed, but no third party can predict in advance what that URL will be.

When the remote device 110 is directed to establish a maintenance bridge (whether because of the action of a local operator, or because of a scheduled or otherwise automatic event), it determines the URL of the bridge application 120. Such a determination can happen via various mechanisms including for example, by the remote device 110 checking its configuration for a fixed URL. The remote device 110 can additionally alternatively use a cryptographic algorithm, a time value, and a pre-shared key to calculate what the current URL of a deployed bridge application 120, if any, will be.

Once the remote device 110 has obtained or otherwise determine the URL, the remote device 110 can establish a connection to the bridge application 120 using that URL.

Once the connection is established between the remote device 110 and the bridge application 120 various scenarios can be triggered. In a first scenario, if the bridge application 120 is configured to await inbound connections only, then the bridge application 120 does nothing until the support server 130 also connects to the bridge application 120, using the same (fixed or cryptographically calculated) URL that the remote device 110 used to connect. In this instance, the support server 130 needs to know when to initiate its own connection to the bridge application 120. This information can be the result of a separate communication (e.g. an operator with the remote device 120 sending a request to initiate such a bridge using a different communication protocol or modality) or by other means, such as a timer or event-based initiation. Thereafter, the support server 120 establishes a connection to the bridge application 120.

In another scenario, if the bridge application 120 is configured to initiate a connection to the support server 130 when it receives a connection from the remote device 110, the bridge application 120 can do so using information (e.g. network addresses and credentials) with which it has been pre-configured.

Once there is a connection between the bridge application 120 and the support server 130, as well as the exiting connection between the remote device 110 and the bridge application 120, the bridge application 120 facilitates communication between the two connections, such that the support server 130 has access to the remote device 110; as a result, a technician (by way of the support server 130) can log in to the remote device 110, and perform whatever operations are necessary.

FIG. 1 is a diagram 100 showing a normal operating diagram in which the remote device 110 is not in communication with the bridge application 120 (via, a port in the firewall 150). Subsequently, and with reference to the diagram 200 of FIG. 2, a tunnel can be generated between the bridge application 120 and the support server 130 (which can listen, for example, on port 9955 on proxy). The tunnel can be created using an autogenerated RSA encrypted key pair and is initiated from the bridge application 120. In some cases, the deployment engine 140 triggers the creation of the tunnel by the bridge application 120. The proxy provided in this regard can be configured so as to prevent remote port forwarding. With reference to diagram 300 of FIG. 3, the remote device 110 establishes a connection to the bridge application 120 and sets up an SSH tunnel (using for example port 9995 as a destination which causes such port to be opened on the support server 130). Thereafter, as illustrated in diagram 400 of FIG. 4, the support server 130 recognizes the remote tunnel and connects via SSH to the bridge application 120 which forwards the connection through the tunnel to the remote device 110. When the session is complete, or at any time, the user of the remote device 110 can terminate the connection. At such time, the bridge application 120 can be destroyed and the tunnel between the remote device 110 and the bridge application 120 and the tunnel between the bridge application 120 and the support server 130 can both be closed (thereby leaving no trace of the connection at either of the support server 130 or the remote device 110).

The following is an example use case for a router allowing access to a secure network (referred to here as the remote device 110). With this scenario, a customer has purchased a remote device 110 in order to allow one of his remote users to access deployed, secure networks. The remote user will be located in a facility in an undisclosed location, so the customer cannot allow a technician direct access to the remote device 110 (via the support server 130) in the event that troubleshooting and/or maintenance are required. Further, the remote user is in a location where the remote device 110 may be stolen, and the customer does not want any indication that a technician ever connected to the remote device 110, or (more importantly) from where such a connection might have originated.

The customer chooses the following deployment options:

The bridge application 120 will use cryptographic, time-hash-based URLs so that the location of the bridge application 120 can never be anticipated by a third party.

The traceless bridge provided by the bridge application 120 will only be available from the hours of 0000-0100, UTC, each day.

The bridge application 120 will accept inbound connections only, from both the remote device 110 and the support server 130.

The customer decides on a pre-shared secret key of "f5ae662a-750e-47b1-abdd-204e75d2bae6" for the traceless bridge. The remote device 110, the deployment engine 140, and the support server 130 are all configured to be aware of the pre-shared secret key, as well as the URL base of the bridge application 120 (i.e., PaaS or other provider that will be used to deploy the traceless bridge, etc.).

The remote device 110 is given to the remote user, the remote user travels to his work location and places the remote device 110 into service.

Some days later, the remote user determines that there is an issue with the remote device 110, and communicates that information to his supervisor, the customer. The customer directs the deployment engine 140 to establish a traceless bridge for the Fognigma Technician to use to connect to the remote device 110 via the support server 130 in order to diagnose the problem.

The deployment engine 140 sees that the remote device 110 was configured to reach out to a bridge application 120 only from 0000-0100 UTC, so it calculates a time code (standard Unix time, seconds since the Unix Time Epoch) for the beginning of the next upcoming time window (Jun. 25, 2019 at 12:00 AM UTC): 1561420800. The deployment engine 140 concatenates that value with the configured pre-shared key for this particular traceless bridge (f5ae662a-750e-47b1-abdd-204e75d2bae6) and then applies a strong cryptographic hash algorithm such as SHA256 to obtain a hash digest: "239edae92b50549c2ea1b111315ce911e31ff55f7 e55309671efd630ed9d6988". The deployment engine 140 constructs an instance of the bridge application 120 with correct credentials for the particular remote device 110 and support server 130, and deploys it such that it will be ready for use by the specified time. The deployment engine 140 assigns the URL based on the hash that it has generated, and upon the URL base (cfapps.io) applicable to the PaaS or other provider it is using to deploy the bridge application 120.

At 0000 UTC, the remote device 110 determines that its schedule indicates that it should attempt to connect to a bridge application 120. The remote device 110 determines the time value of the beginning of the time window, and uses that and the pre-shared secret and the same cryptographic hash algorithm to calculate the same hash value, then appends the PaaS provider URL base it was configured to use.

The remote device 110 connects to 239edae92b50549 c2ea1b111315ce911e31ff55f7e55309671efd630ed9d6988. cfapps.io, and directs the bridge application 120 to forward SSH traffic on TCP port 22 to the remote device 110.

The Technician has been made aware of the need for maintenance on the remote device 110, and directs his workstation (i.e., the support server 130) to establish a connection to the bridge application 120 at 0000 UTC. The support server 130 performs the same calculations as the deployment engine and the remote device 110, and thus determines the correct URL to connect to; it establishes a connection to the bridge application 12-, and initiates a connection on the SSH port (22); the bridge application 120 forwards that connection, through the established connection from the remote device 110, to the remote device 110 itself, such that the support server 130 is actually connecting to the remote device 110, using the bridge application 120 as a proxy.

The Technician makes use of the SSH connection to the remote device 110 to log in, perform whatever maintenance is required, and then log out. The support server 130 then disconnects from the bridge application 120.

At the end of the prescribed time window, the remote device 110 closes its connection to the bridge application 120.

At the end of the prescribed time window, the deployment engine 140 destroys the deployed instance of the bridge application 120.

The Technician has successfully performed required maintenance on the remotely-located remote device 110 without ever having had to know the physical location or network address of the remote device 110, and the remote device 110 has no forensic record of the IP address of the support server 130, so (in the event that the remote device 110 is stolen and investigated) there is nothing that indicates the location of the Technician.

Figure 5:
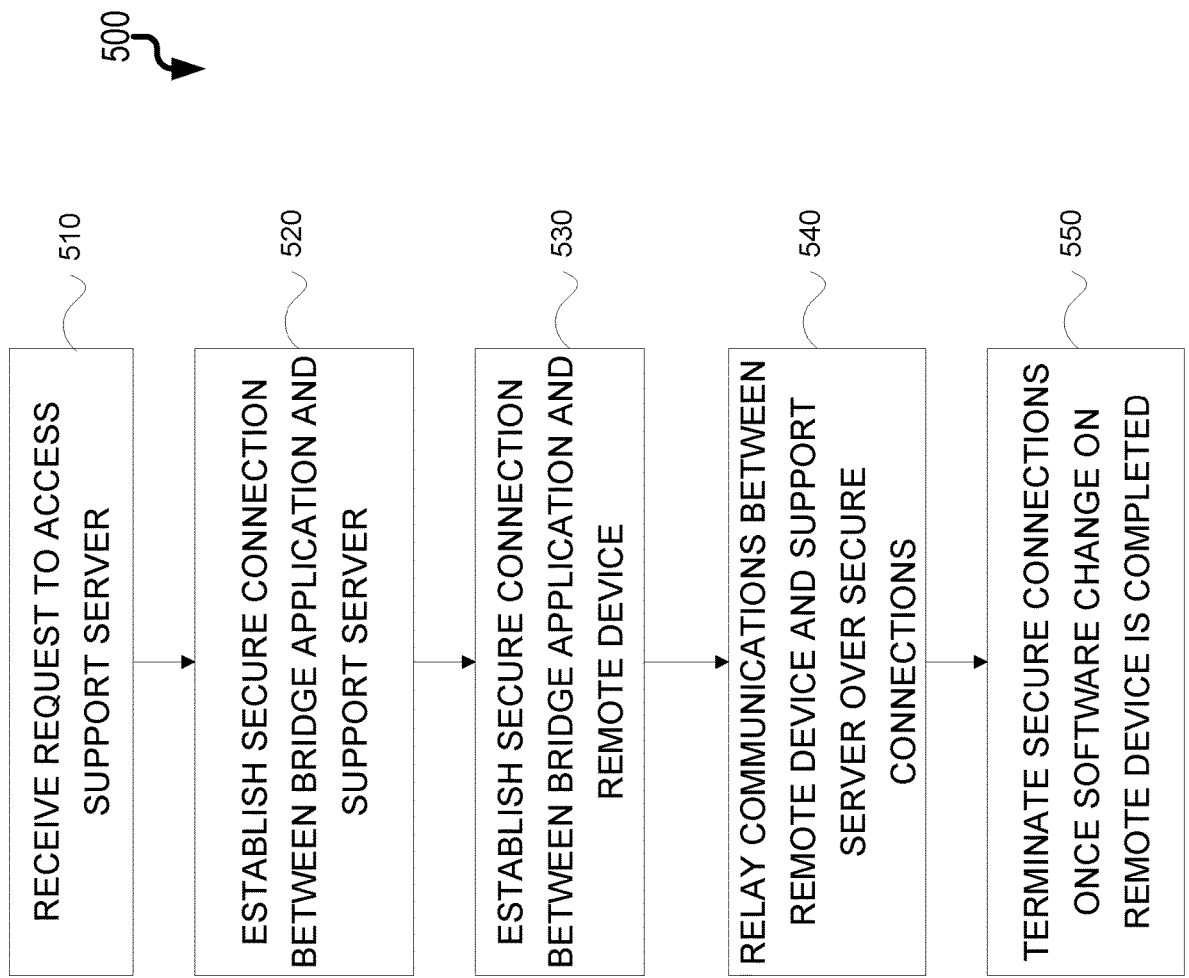
FIG. 5 is a process flow diagram illustrating the provision of traceless access to a remote device in an undisclosed location.

FIG. 5 is a process flow diagram in which, at 510, a bridge application receives a request from a remote device to access a support server. Subsequently, at 520, the bridge application established a secure connection between the bridge application and the support server and, at 530, establishes a secure connection between the bridge application and the remote device. Once these secure connections are both established, at 540, communications are relayed between the remote device and the support server to effect a software change to network device. The secure connections are later terminated, at 550, upon completion of the software change to the remote device.

Figure 6:
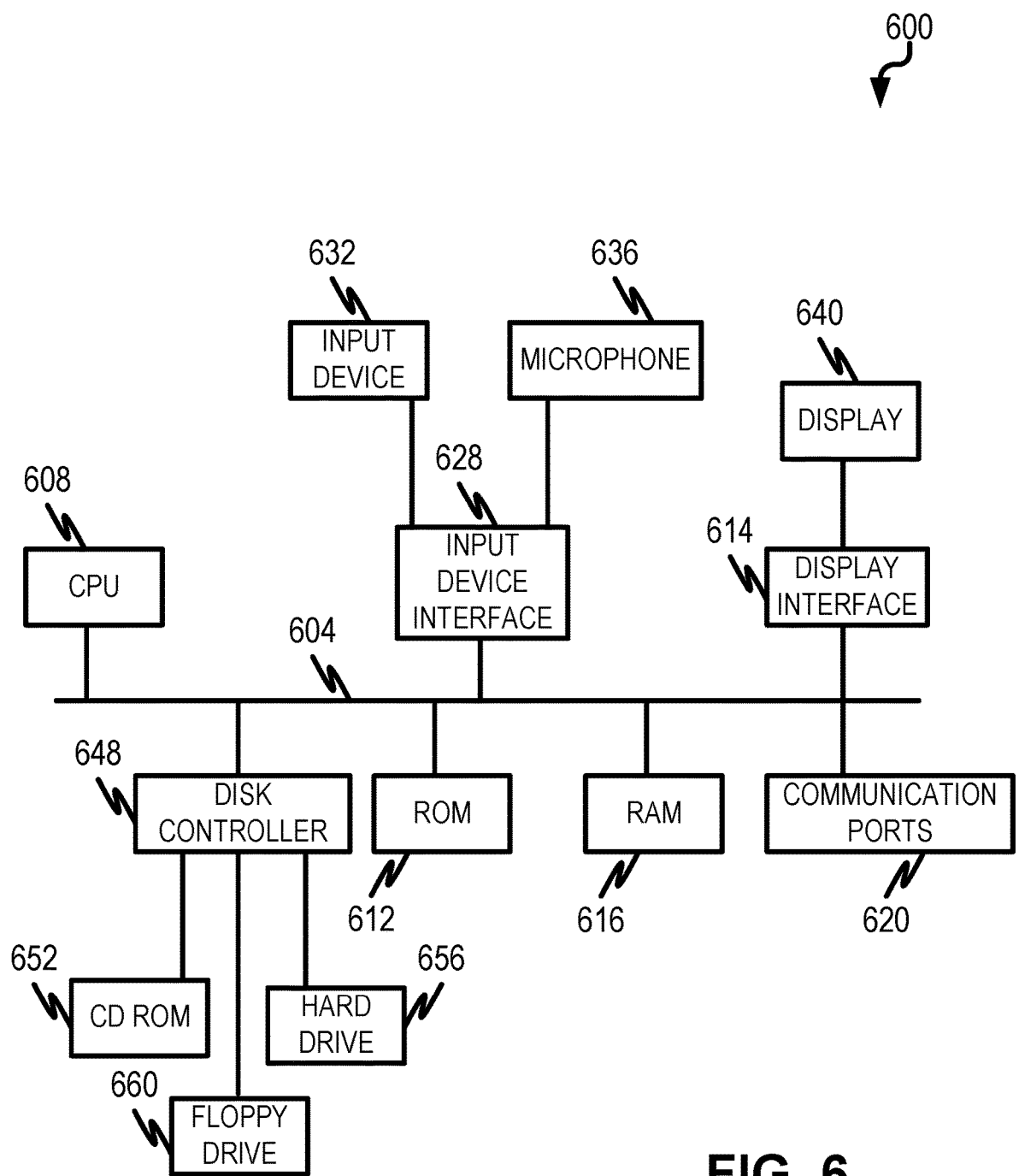
FIG. 6 is a diagram illustrating a computing device for implementing subject matter described herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   managing by a deployment engine deployment of a bridge application;
   receiving, by the bridge application from a remote device, a request to access a support server;
   establishing, by the bridge application, a secure connection between the bridge application and the support server;
   establishing, by the bridge application, a secure connection between the bridge application and the remote device, wherein the bridge application is configured to only accept authenticated inbound connections from at least one of the remote device and the support server;
   relaying, by the bridge application once both secure connections are established, communications between the remote device and the support server to effect a software change to network device; and
   terminating, upon completion of the software change to the remote device, the secure connections.

2. The method of claim 1, wherein the remote device is a router providing access to a secure computing network.

3. The method of claim 1, wherein the support server is configured to accept inbound connections via secure shell (SSH).

4. A method comprising:
   managing by a deployment engine deployment of a bridge application;
   receiving, by the bridge application from a remote device, a request to access a support server;
   establishing, by the bridge application, a secure connection between the bridge application and the support server;
   establishing, by the bridge application, a secure connection between the bridge application and the remote device, wherein the bridge application is configured to only accept authenticated inbound connections from at least one of the remote device and the support server;
   relaying, by the bridge application once both secure connections are established, communications between the remote device and the support server to effect a software change to network device; and
   terminating, upon completion of the software change to the remote device, the secure connections;
   wherein the support server is configured to allow outbound connections only and reject all inbound connections.

5. The method of claim 1, wherein the bridge application is configured to route network traffic between the remote device and the support server.

6. The method of claim 1, wherein the bridge application is configured to initiate a connection with the support server and routes network traffic between the remote device and the support server when the bridge application receives an authenticated inbound connection from the remote device.

7. The method of claim 1, wherein the request to access the support server is initiated in response to a user-generated action via the remote device.

8. The method of claim 1, wherein the request to access the support server is initiated according to a pre-defined schedule.

9. The method of claim 1, wherein the request to access the support server is triggered upon an occurrence of an event.

10. The method of claim 1, wherein the remote device accesses the bridge application using a fixed URL to effect the request.

11. The method of claim 1, wherein the remote device accesses the bridge application using a cryptographically calculated URL to effect the request.

12. The method of claim 1, wherein the bridge application executes on a platform-as-a-service (PaaS) container.

13. A system comprising:
    one or more data processors;
    one or more computer-readable mediums encoded with instructions for commanding the one or more data processors to execute a method, comprising:
       managing by a deployment engine deployment of a bridge application;
       receiving, by the bridge application from a remote device, a request to access a support server;
       establishing, by the bridge application, a secure connection between the bridge application and the support server;
       establishing, by the bridge application, a secure connection between the bridge application and the remote device, wherein the bridge application is configured to only accept authenticated inbound connections from at least one of the remote device and the support server;

relaying, by the bridge application once both secure connections are established, communications between the remote device and the support server to effect a software change to network device; and terminating, upon completion of the software change to the remote device, the secure connections.

14. The system of claim 13, wherein the remote device is a router providing access to a secure computing network.

15. The system of claim 13, wherein the support server is configured to accept inbound connections via secure shell (SSH).

16. The system of claim 13, wherein the support server is configured to allow outbound connections only and reject all inbound connections.

17. The system claim 13, wherein the bridge application is configured to route network traffic between the remote device and the support server.

18. The system of claim 13, wherein the bridge application is configured to initiate a connection with the support server and routes network traffic between the remote device and the support server when the bridge application receives an authenticated inbound connection from the remote device.

19. The system of claim 13, wherein the request to access the support server is initiated in response to a user-generated action via the remote device.

20. A computer-readable medium encoded with instructions for commanding one or more data processors to execute steps of a method, comprising:

managing by a deployment engine deployment of a bridge application;

receiving, by the bridge application from a remote device, a request to access a support server;

establishing, by the bridge application, a secure connection between the bridge application and the support server;

establishing, by the bridge application, a secure connection between the bridge application and the remote device, wherein the bridge application is configured to only accept authenticated inbound connections from at least one of the remote device and the support server;

relaying, by the bridge application once both secure connections are established, communications between the remote device and the support server to effect a software change to network device; and terminating, upon completion of the software change to the remote device, the secure connections.

21. The method of claim 1, wherein the deployment engine deploys a running instance of the bridge application to establish a particular connection between the remote device and the support server.

* * * * *